US012540556B2

(12) United States Patent
Hogate

(10) Patent No.: US 12,540,556 B2
(45) Date of Patent: Feb. 3, 2026

(54) KNIFE SEAL WEAR MEASUREMENT

(71) Applicant: RTX Corporation, Farmington, CT (US)

(72) Inventor: Isaac Jon Hogate, Farmington, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/757,924

(22) Filed: Jun. 28, 2024

(65) Prior Publication Data

US 2025/0075626 A1 Mar. 6, 2025

Related U.S. Application Data

(60) Provisional application No. 63/536,295, filed on Sep. 1, 2023.

(51) Int. Cl.

*F01D 21/00* (2006.01)
*F01D 11/00* (2006.01)
*F01D 11/02* (2006.01)

(52) U.S. Cl.

CPC ............ *F01D 11/001* (2013.01); *F01D 11/02* (2013.01); *F01D 21/003* (2013.01); *F05D 2230/90* (2013.01); *F05D 2240/55* (2013.01); *F05D 2260/80* (2013.01); *F05D 2300/2112* (2013.01); *F05D 2300/611* (2013.01)

(58) Field of Classification Search

CPC .. F01D 11/001; F01D 21/003; F05D 2260/80; F05D 2300/2112; F05D 2300/611

See application file for complete search history.

(56) References Cited

U.S. PATENT DOCUMENTS

| | | | | |
|---|---|---|---|---|
| 5,024,884 | A | 6/1991 | Otfinoski | |
| 8,031,346 | B2 | 10/2011 | Biswas et al. | |
| 8,988,668 | B2 | 3/2015 | Kurokawa et al. | |
| 9,116,071 | B2 | 8/2015 | Hatcher, Jr. et al. | |
| 2013/0163848 | A1 | 6/2013 | Ulbricht et al. | |
| 2013/0259659 | A1 * | 10/2013 | Knaul | F01D 11/001 415/170.1 |
| 2016/0281531 | A1 * | 9/2016 | Dube | F01D 11/001 |
| 2016/0305769 | A1 | 10/2016 | Burnside et al. | |
| 2020/0263286 | A1 | 8/2020 | Dudon et al. | |

FOREIGN PATENT DOCUMENTS

| | | | | |
|---|---|---|---|---|
| CN | 218495987 | U | 2/2023 | |
| FR | 3082886 | A1 | 12/2019 | |
| FR | 3120895 | A1 * | 9/2022 | F16J 15/4472 |

OTHER PUBLICATIONS

European Search Report dated Dec. 23, 2024 for European Patent Application No. 24185517.0.

* cited by examiner

*Primary Examiner* — Nathaniel E Wiehe
*Assistant Examiner* — Theodore C Ribadeneyra
(74) *Attorney, Agent, or Firm* — Bachman & LaPointe, P.C.

(57) ABSTRACT

A coated knife edge seal member has an annular knife edge having: a flank having a first end face and a second end face. The knife edge has: a tip converging to a rim; and an annular reference datum. The member has a metallic substrate and a coating on the substrate at the tip.

18 Claims, 5 Drawing Sheets

KNIFE SEAL WEAR MEASUREMENT

CROSS-REFERENCE TO RELATED APPLICATION

Benefit is claimed of U.S. Patent Application No. 63/536,295, filed Sep. 1, 2023, and entitled "Knife Seal Wear Measurement", the disclosure of which is incorporated by reference herein in its entirety as if set forth at length.

BACKGROUND

The disclosure relates to gas turbine engines. More particularly, the disclosure relates to coated knife-edge seals.

Gas turbine engines (used in propulsion and power applications and broadly inclusive of turbojets, turboprops, turbofans, turboshafts, industrial gas turbines, and the like) often include knife edge seals. Typically, the knife edge may interface with a relatively abradable material such as metallic honeycomb. The knife edge is typically provided by a coated metal substrate. Example coatings are ceramic such as alumina. One broad area involves rotors wherein the knife edges protrude generally radially outward and interface with an abradable runner such as along an inner diameter (ID) platform section of a vane ring assembly.

In an as-manufactured condition, the knife edge tip is formed by the coating at a corresponding tip of the knife edge section of the substrate. With use, the thickness of the coating at the tip wears down until substrate is ultimately exposed. It is desirable to not allow wear to get to the point of exposing substrate.

Accordingly, based upon established experience, a safe interval may be determined wherein it is unlikely that the coating will have worn through. The interval, for example, may be measured in engine hours or other parameter or combination of parameters. Accordingly, in a routine maintenance situation, upon reaching the interval, the knife edge may be visually observed to confirm lack of wear-through. Thereupon, the coating may be stripped (e.g., via water jet) and a new coating applied (e.g., via plasma coating). If worn-through, however, a further inspection (e.g., eddy current) may be used to check for cracks. If cracked over a limit the part may be scrapped. Otherwise, the substrate is measured (via coordinate measuring machine (CMM)) to check whether the wear remains within blueprint tolerance. If so, there may be a recoat. If no wear through, there may will be an eddy current inspection.

SUMMARY

One aspect of the disclosure involves a coated knife edge seal member comprising an annular knife edge having; a flank having a first end face and a second end face; a tip converging to a rim; and an annular reference datum. The member has a metallic substrate and a coating on the substrate at the tip.

In a further embodiment of any of the foregoing embodiments, additionally and/or alternatively, the reference datum is on the flank.

In a further embodiment of any of the foregoing embodiments, additionally and/or alternatively the reference datum is an annular protrusion; and the coating is not along an apex of the annular protrusion.

In a further embodiment of any of the foregoing embodiments, additionally and/or alternatively, the flank is off-radial by an angle of 5° to 45° and the substrate is a nickel-based alloy or titanium-based alloy.

In a further embodiment of any of the foregoing embodiments, additionally and/or alternatively, the coating is alumina-based.

In a further embodiment of any of the foregoing embodiments, additionally and/or alternatively: the annular knife edge is a first annular knife edge; and the coated knife edge seal member further comprises: a second annular knife edge. The second annular knife edge has: a flank having a first end face and a second end face; a tip converging to a rim; and an annular reference datum. The coating is on the substrate at the tip of the second annular knife edge. The second annular knife edge is spaced from the first annular knife edge by a gap.

In a further embodiment of any of the foregoing embodiments, additionally and/or alternatively, a gas turbine engine includes the coated knife edge seal member and further comprises a vane stage having an inner diameter honeycomb interfacing with the coated knife edge seal member.

In a further embodiment of any of the foregoing embodiments, additionally and/or alternatively, the coated knife edge seal member protrudes radially outward from an inter-disk spacer.

In a further embodiment of any of the foregoing embodiments, additionally and/or alternatively, the reference datum, in central axial/radial section has a vertex.

In a further embodiment of any of the foregoing embodiments, additionally and/or alternatively, a method for manufacturing the coated knife edge seal member comprises: forging; machining; and applying the coating while not coating the reference datum.

In a further embodiment of any of the foregoing embodiments, additionally and/or alternatively, a method for using the coated knife edge seal member comprises optical measuring a distance from the reference datum to the rim.

In a further embodiment of any of the foregoing embodiments, additionally and/or alternatively, the method further comprises: responsive to the measuring yielding an insufficient value, stripping the coating and recoating.

In a further embodiment of any of the foregoing embodiments, additionally and/or alternatively, the optical measuring comprises structured-light 3D scanning.

In a further embodiment of any of the foregoing embodiments, additionally and/or alternatively: the coated knife edge seal is on a rotor of a gas turbine engine; and the optical measuring comprises reorienting a scanner head and rotating the rotor.

A further aspect of the disclosure involves a method for inspecting a coated knife edge seal member. The coated knife edge seal member comprises an annular knife edge. The annular knife edge has: a flank having a first end face and a second end face; a tip converging to a rim; and a reference datum. The member has: a metallic substrate; and a coating on the substrate at the tip. The method comprises optical measuring a distance from the reference datum to the rim.

In a further embodiment of any of the foregoing embodiments, additionally and/or alternatively, the method further comprises: responsive to the measuring, determining that a thickness of the coating at the rim had fallen below a threshold value; stripping the coating; and recoating.

In a further embodiment of any of the foregoing embodiments, additionally and/or alternatively, the optical measuring comprises structured-light 3D scanning.

In a further embodiment of any of the foregoing embodiments, additionally and/or alternatively, the coated knife edge seal is on a rotor and the optical measuring comprises reorienting a scanner head and rotating the rotor.

A further aspect of the disclosure involves, a coated knife edge seal member comprising an annular knife edge having: a flank having a first end face and a second end face; and a tip converging to a rim. The member has: a metallic substrate; a coating on the substrate at the tip; means for providing a reference datum for optical measurement of a thickness of coating at the rim.

In a further embodiment of any of the foregoing embodiments, additionally and/or alternatively, the means comprises a full annular feature.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Due to the margin involved in selecting the target strip and recoat interval, in most situations at the time of a conventional strip and recoat operation, there will be substantial coating left at the knife edge tip. The target strip and recoat interval may not be a worst case scenario situation but nevertheless may not be ideal. Thus, in most situations there may be strip and recoat when a significant useful coating life remains.

A sufficiently precise measurement technique performable in situ may be useful to determine that some knife edges which have reached the target strip and recoat interval nevertheless have sufficient coating for substantial continued service. In such a situation, a new follow-up inspection interval may be set for subsequent measurement. Or a strip and recoat interval may be set based on the current measurement.

The follow-up inspection interval may be shorter than the initial target interval (the interval after original manufacture or recoat). In alternative implementations, the initial inspection interval may be reduced relative to a baseline strip and recoat interval to obtain better data and potentially reduce scrappage.

The example measurement technique is optical scanning, in particular structured blue light scanning. Such scanners are available as the ATOS series structured blue light scanners from Carl Zeiss GOM Metrology GmbH, Braunschweig, Germany. The technique measures the position of the worn knife edge tip, inclusive of any wear coating, relative to an unworn reference. The example reference is away from the tip wear coating. Thus, subtracting the distance between the reference and the tip of the substrate, a coating thickness at the tip may be determined.

Figure 1:
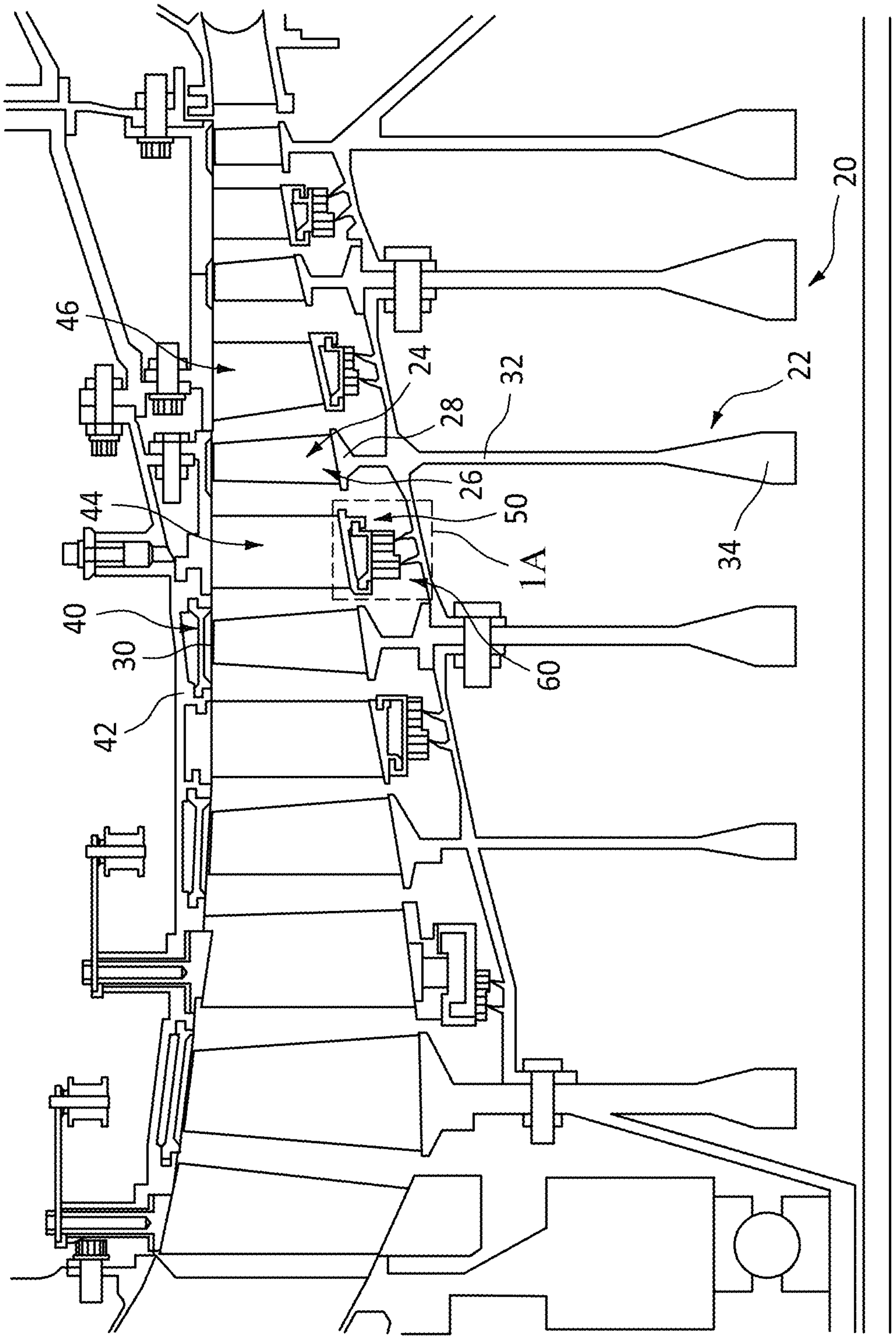
FIG. 1 is a partially schematic sectional view of a high-pressure compressor (HPC) section of a gas turbine engine.

FIG. 1 shows a rotor 20. The example rotor is of a high-pressure compressor (HPC) section of a high spool of a two-spool engine. The HPC has multiple stages of blades on or of associated blade disks. As is discussed below various of the disks are shown sealing to static (non-rotating) structure via knife edge seals. With reference to an example disk 22, the example blade disk is integrally bladed. In the rotor, example disk materials are forgings (e.g., Ti-alloy for upstream stages and Ni-alloy for downstream). The blade disk has a stage of blades 24 having airfoils 26 extending radially outward from an outer rim section 28 of the disk to respective blade tips 30. A web 32 extends radially inward from the rim section to a centrally-apertured protuberant disk bore 34. The tips interface with an associated blade outer air seal (BOAS) stage 40 held by a case 42. Vane stages alternate with the blade stages of the rotor. In the illustrated example, there are respective vane stages 44, 46 ahead of and behind (upstream and downstream of) the blade stage 22. The example vane stage 46 is a fixed vane stage with outer ends mounted to the case and inner ends connected to form a platform ring 50. Alternative variable vane stages (of which one is shown upstream/forward of the first HPC blade stage) have outer ends pivotally mounted to the case and inner ends pivotally mounted to a platform ring.

Figure 1A:
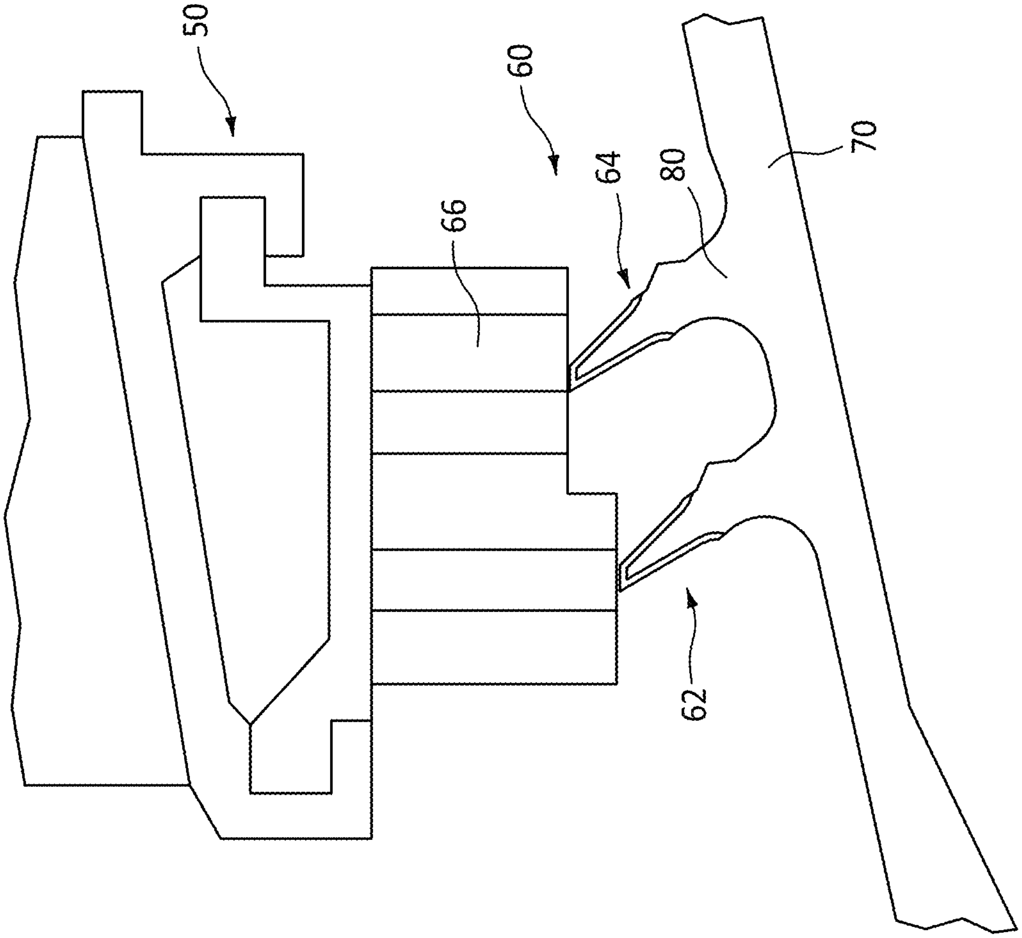
FIG. 1A is an enlarged view of a knife seal system in the engine of FIG. 1.

A knife edge seal system 60 (FIG. 1A) includes one or more knife edges 62, 64 of the disk interfacing with an abradable runner 66 of the static structure (e.g., of the platform ring 50). The example seal system has two closely spaced knife edges on an axially-protruding sleeve section 70 of the disk. The disk has a metallic substrate 80 (FIG. 2A) having respective knife edge portions for the two knife edges. The knife edge portions each have a root or flank section with fore and aft flank surfaces or faces 88, 90 having filleted transitions 92, 94 to the sleeve. The example flank section, in axial section, has a centerline off-radial by an angle θ of 0° to 45° or 0° to 35° or 5° to 35° or 10° to 35°.

Figure 2:
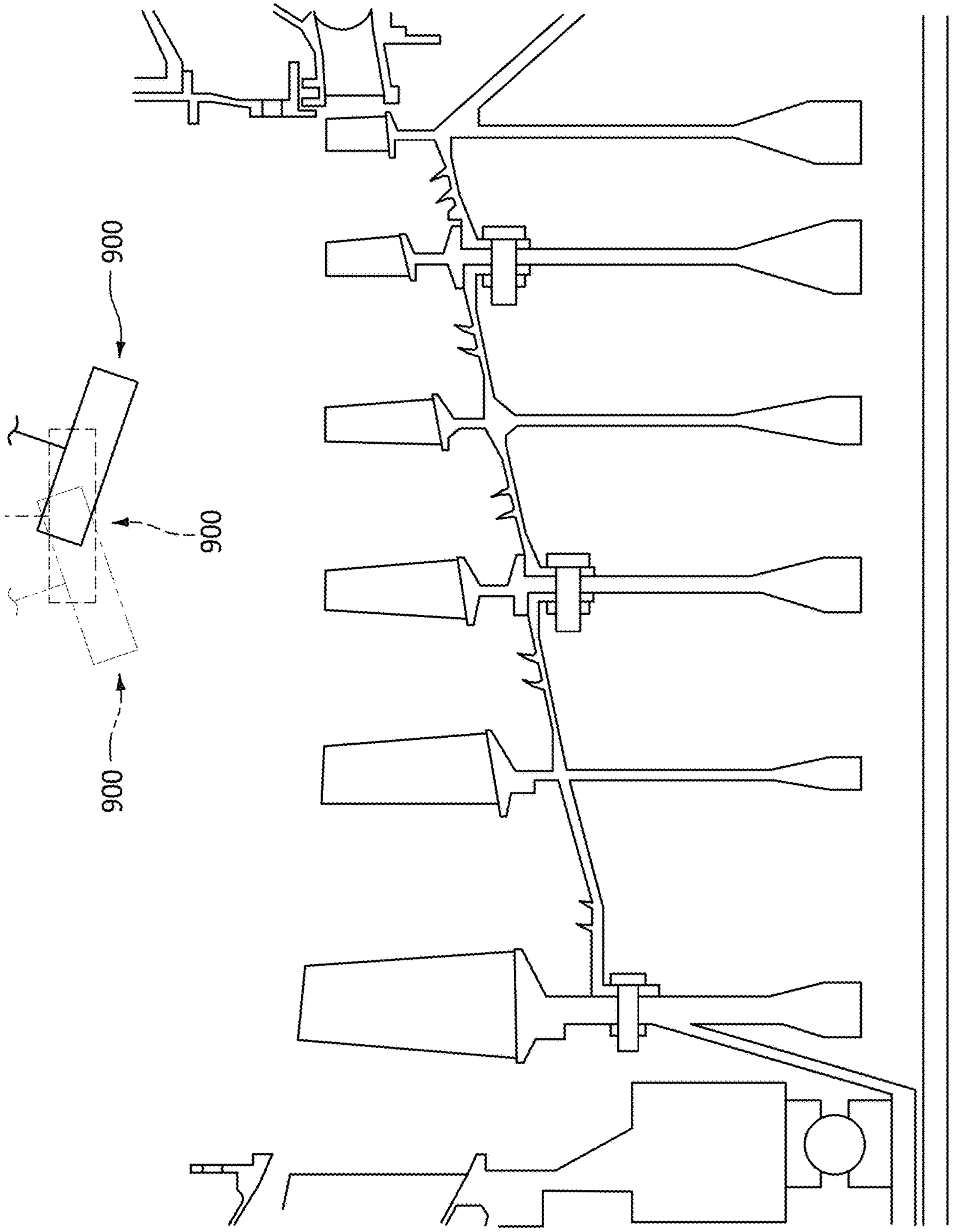
FIG. 2 is a view of the HPC with case removed.
Figure 2A:
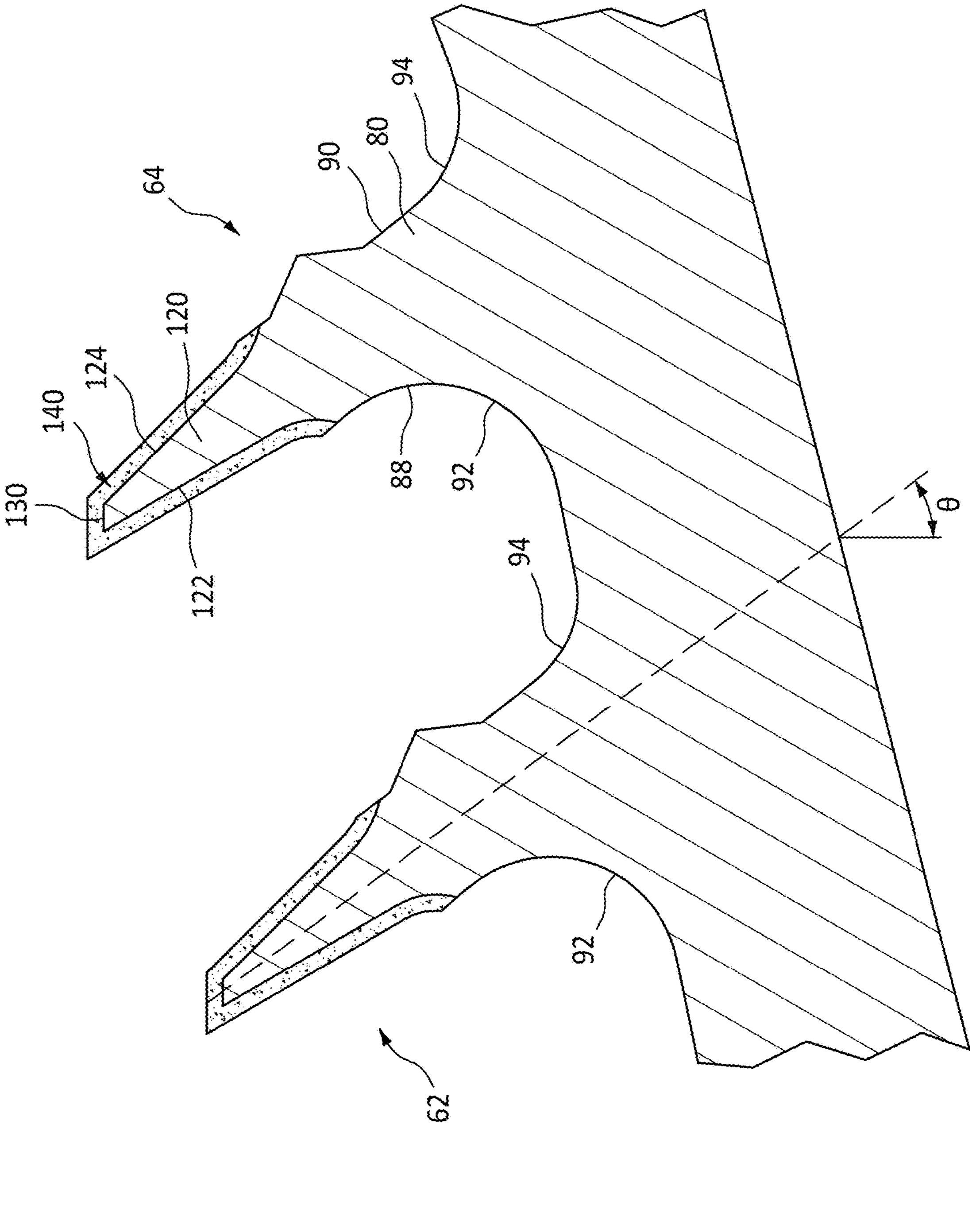
FIG. 2A is an enlarged view of a pair of knife edges in the HPC of FIG. 2.
Figure 2B:
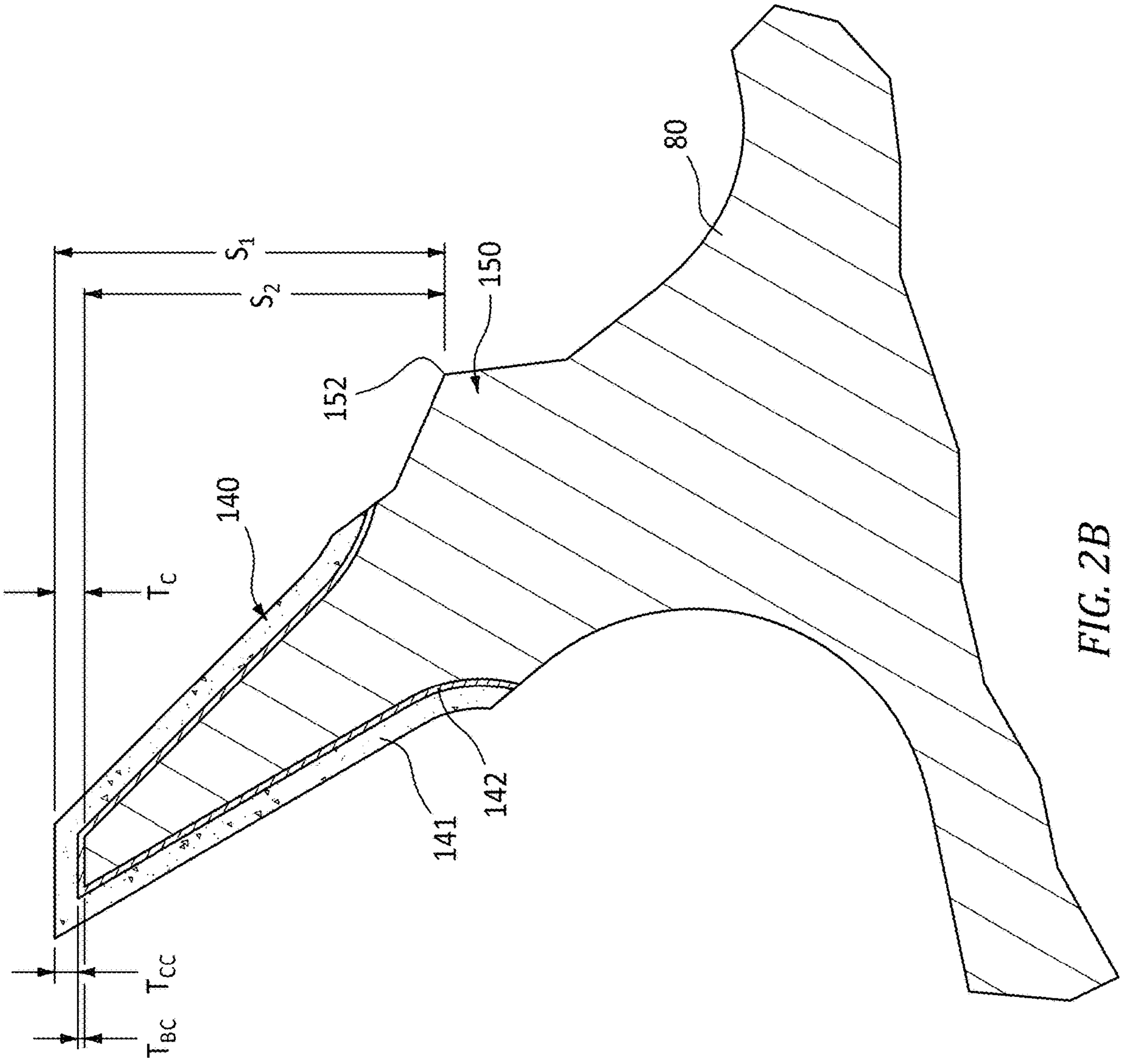
FIG. 2B is a further enlarged view of a single knife edge.

The knife edge portions have tip sections 120 having fore and aft faces 122, 124 (FIG. 2A) extending to an outboard rim 130. The tip sections may be precision ground. A wear coating 140 covers the knife edge portions, particularly at and near the rim when newly coated. The wear coating 140 consists of or comprises a ceramic layer (e.g., plasma sprayed) such as alumina or more broadly alumina-based or at least 50 weight percent alumina or at least 85 weight percent. An example mixture is an alumina with small amounts of titania and impurities. There may be a bond coat such as a nickel-aluminum alloy (e.g., plasma-sprayed) between substrate and ceramic. FIG. 2B shows a ceramic layer 141 atop a bond coat 142.

A thickness of the coating 140 at the tip (FIG. 2B) is shown as $T_C$, measured as a radial thickness. The example $T_C$ is about 0.25 millimeter new, more broadly, at least 0.15 millimeter or 0.15 millimeter to 0.40 millimeter or 0.15 millimeter to 0.50 millimeter.

Example bondcoat thickness TBC is about 0.05 to 0.10 millimeter or zero up to an example 0.15 millimeter. The ceramic may have an example thickness $T_{CC}$ of about 0.20 millimeter (more broadly at least 0.10 millimeter or at least 0.15 millimeter or 0.10 to 0.35 millimeter or 0.10 to 0.50 millimeter or 0.10 to 0.45 millimeter or 0.15 to 0.45 millimeter). Thus, the ceramic (as applied) thickness Tec may represent at least 50% of the coating thickness $T_C$ or at least 70%. Such coatings and thicknesses may be purely conventional or yet-developed.

An example worn threshold thickness (e.g., an "at or below" threshold or a "below" threshold) used as a mandate for strip and recoat is selected to leave some ceramic (e.g., at least 0.05 millimeter, more particularly a threshold worn Tec in the range of 0.05 millimeter to 0.20 millimeter of ceramic with alternative lower limits of 0.8 millimeter and 0.10 millimeter (e.g., a threshold value in the range of 0.10 millimeter to 0.20 millimeter) such mandate may thus add the bondcoat (if any) thickness to determine the threshold value of worn $T_C$.

The threshold may relative to as-applied $T_{CC}$ may represent a loss of about 0.10 millimeter, more broadly 0.08 millimeter to 0.40 millimeter or 0.10 millimeter to 0.30 millimeter or 0.10 millimeter to 0.20 millimeter.

To provide the references, each substrate knife edge portion has an integral annular (full annulus about the rotor centerline) feature 150 along one of its flank surfaces. The example reference features are annular protrusions. The example cross-sectional shape in central axial/radial section is triangular. The protrusions have apexes 152 (at the free distal corner of the cross-section triangle) and are uncoated along the apexes. The distinct vertex in cross-section at the apex facilitates precise recognition by the scanner (as opposed to a semi-circular or similarly arcuate cross-section of large radius). In further embodiments, particularly ones with less of an off-radial angle, the apex may be an axial apex with both the faces radially inboard and outboard extending axially away in the same direction.

In use, an example measurement involves opening the case 42 to expose the knife edge(s). This may involve removing a case segment and associated vanes. Such removal need not be the full stage of vanes if the engine configuration allows. The scanner head 900 (FIG. 2) is then positioned to bring the reference and knife edge into the visual field of the scanner to take a measurement. The measurement may be of a span $S_1$ from the reference datum (e.g., apex 152) to the coated tip. From this, a corresponding uncoated span $S_S$ May be Deducted to yield $T_C$. The rotor may then be manually rotated in increments and further measurements taken. If sufficient coating is found at all locations, the engine may be reassembled and placed back into service until the next inspection interval. If insufficient coating is found, there may be a strip (e.g., water jet strip) and recoat (e.g., plasma spray of ceramic and bond coat (if any)).

An example scanning includes such incremental rotor rotation plus incremental reorientation of the scanner head to obtain a 3D model. For example, FIG. 2 shows a solid line initial orientation of the scanner head. An initial rotational pass may be taken with the scanner in this position by incrementally rotating the rotor by a specific angular increment/interval and taking snapshots at each interval. Intervals are small enough so that the images gained may be stitched to create the model. After completing a rotation, the head is incremented to the next orientation (e.g., shown in broken lines facing more directly radially inward) and a similar series of snapshots taken. A further increment of the scanner head orientation may approach from a different angle and have a similar series of images. The resulting images from the various angles are computationally stitched into a model allowing the computer system (not shown) to determine $S_1$ and, therefore, calculate $T_C$ based on known $S_2$ (or calculate $T_{CC}$ based on known $S_2$ and nominal or other spec. TBC).

In further examples, in the original manufacture situation after forging, the entire outer profile of the disk is machined including forming the knife edge members out of a larger simpler feature and shaping the tips. Before any coating, the dimension $S_2$ is measured such as via the contact-type coordinate measuring machine typically used or via the scanner. A record is kept of this for future use in monitoring. Thus, when the in-service inspection occurs, the structured light scanning determines $S_1$ and then subtracts the known original $S_2$ for that particular individual part (as opposed to the $S_2$ specification) to determine the coating thickness $T_C$ (or ceramic thickness $T_{CC}$ via also subtracting nominal or other spec. TBC).

Component materials and manufacture techniques and assembly techniques may be otherwise conventional.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline seal configuration, details of such baseline may influence details of particular implementations. Accordingly, other embodiments are within the scope of the following claims.

What is claimed is:

1. A coated knife edge seal member comprising:
an annular knife edge having:
a flank having a first end face and a second end face;
a tip converging to a rim; and
an annular reference datum;
a metallic substrate; and
a coating on the substrate at the tip,
wherein:
the reference datum is an annular protrusion protruding from the second end face, and
the protrusion has a triangular cross-sectional shape in central axial/radial section.

2. The coated knife edge seal member of claim 1 wherein:
the flank does not have an annular protrusion protruding from the first end face.

3. The coated knife edge seal member of claim 1 wherein:
the coating is not along an apex of the annular protrusion.

4. The coated knife edge seal member of claim 3 wherein:
the flank is off-radial by an angle of 5° to 45°; and
the substrate is a nickel-based alloy or titanium-based alloy.

5. The coated knife edge seal member of claim 3 wherein:
the coating is alumina-based.

6. The coated knife edge seal member of claim 1 wherein:
the annular knife edge is a first annular knife edge;
the coated knife edge seal member further comprises:
a second annular knife edge having;
a flank having a first end face and a second end face;
a tip converging to a rim; and
an annular reference datum;
the coating is on the substrate at the tip of the second annular knife edge; and
the second annular knife edge is spaced from the first annular knife edge by a gap.

7. A gas turbine engine including the coated knife edge seal member of claim 1 and further comprising:
a vane stage having an inner diameter honeycomb interfacing with the coated knife edge seal member.

8. The gas turbine engine of claim 7 wherein:
the coated knife edge seal member protrudes radially outward from an inter-disk spacer.

9. The gas turbine engine of claim 8 wherein:
the reference datum, in central axial/radial section, has a vertex.

10. A method for manufacturing the coated knife edge seal member of claim 1, the method comprising:
forging;
machining; and applying the coating while not coating the reference datum.

11. A method for using the coated knife edge seal member of claim 1, the method comprising:

optical measuring a distance from the reference datum to the rim.

12. The method of claim 11 further comprising:

responsive to the measuring yielding an insufficient value, stripping the coating and recoating.

13. The method of claim 11 wherein:

the optical measuring comprises structured-light 3D scanning.

14. The method of claim 11 wherein:

the coated knife edge seal is on a rotor of a gas turbine engine; and the optical measuring comprises reorienting a scanner head and rotating the rotor.

15. The coated knife edge seal member of claim 1 wherein:

the protrusion protrudes from the flank inboard of an adjacent ground face of the tip.

16. A coated knife edge seal member comprising:

an annular knife edge having:

a flank having a first end face and a second end face; and a tip converging to a rim;

a metallic substrate;

a coating on the substrate at the tip; and means for providing a reference datum for optical measurement of a thickness of coating at the rim, wherein:

the means comprises a protrusion from the second end face, and the protrusion has a triangular cross-sectional shape in central axial/radial section.

17. The coated knife edge seal member of claim 16 wherein:

the means comprises a full annular feature.

18. The coated knife edge seal member of claim 16 wherein:

the protrusion protrudes from the flank inboard of an adjacent ground face of the tip.

* * * * *